United States Patent [19]

Umemoto et al.

[11] Patent Number: 4,700,240
[45] Date of Patent: Oct. 13, 1987

[54] DIGITAL DATA PLAYBACK SYSTEM

[75] Inventors: Masuo Umemoto, Tokyo; Yoshizumi Eto, Sagamihara; Hidehiro Kanada, Kodaira; Morito Rokuda, Katsuta, all of Japan

[73] Assignees: Hitachi, Ltd.; Hitachi Denshi Kabushiki Kaisha, both of Tokyo, Japan

[21] Appl. No.: 795,264

[22] Filed: Nov. 5, 1985

[30] Foreign Application Priority Data

Nov. 6, 1984 [JP] Japan ................................. 59-232503

[51] Int. Cl.⁴ .......................... G11B 5/09; H04N 5/78
[52] U.S. Cl. ...................................... 360/48; 360/36.2
[58] Field of Search .................... 360/39, 48, 53, 38.1, 360/36.2

[56] References Cited

U.S. PATENT DOCUMENTS 4,497,055 1/1985 Hoshino et al. ..................... 360/38.1

Primary Examiner—Vincent P. Canney
Attorney, Agent, or Firm—Antonelli, Terry & Wands

[57] ABSTRACT

Number data affixed to individual digital data divided into a plurality of data blocks are sequentially read out from a recording medium to be used for determining the write-in positions of the digital data in a memory. For determining the write-in positions of the digital data, the number data of the next write-in position is estimated on the basis of the number data of the current write-in position. Judgment is made as to whether or not the number of times of continuous non-coincidence between the estimated number data and the successively read-out number data exceeds a predetermined setting, and, also judgment is made as to whether or not the number data read out each time falls within a predetermined range. Depending on the results of these judgments, one of the read-out number data and the estimated number data is selected to determine the next write-in position.

7 Claims, 11 Drawing Figures

FIG. 1 (PRIOR ART)
| B1 – SB1 | B1 – SB2 |
|---|---|
| ⋮ | ⋮ |
| B1 – SB19 | B1 – SB20 |
| B2 – SB1 | B2 – SB2 |
| ⋮ | ⋮ |
| B2 – SB19 | B2 – SB20 |
| ⋮ | ⋮ |
| B59 – SB1 | B59 – SB2 |
| ⋮ | ⋮ |
| B59 – SB19 | B59 – SB20 |
FIG. 2 (PRIOR ART)
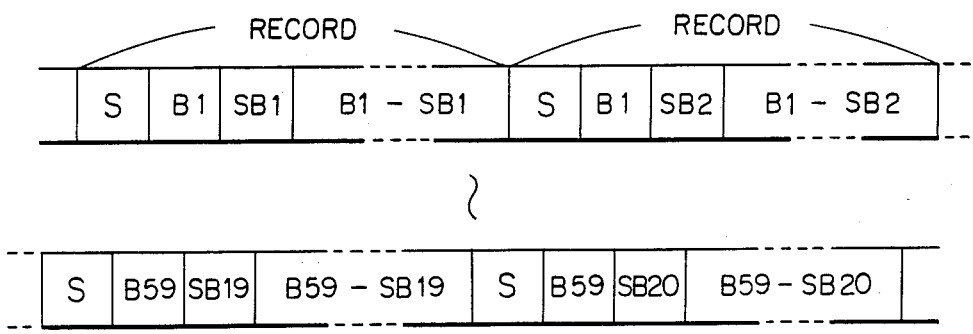
FIG. 3 (PRIOR ART)
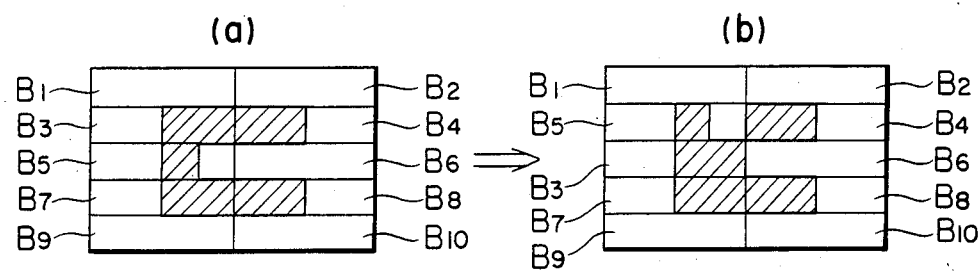

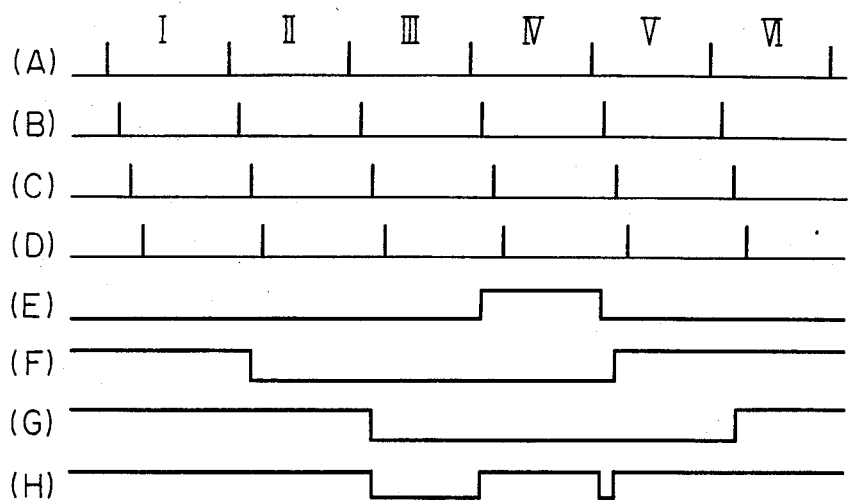

DIGITAL DATA PLAYBACK SYSTEM

BACKGROUND OF THE INVENTION

1. Field of the Invention

This invention relates to a digital data playback system used for reproduction of digital data recorded on a recording medium, such as a magnetic tape, and more particularly to a time base correcting device for correcting any error in the playback timing during reproduction of recorded digital data.

2. Description of the Prior Art

In the course of recording and reproducing data on and from a recording medium, the time base of reproduced data is generally subjected to a variation due to factors including expansion and contraction of the recording medium and speed variation. Therefore, it is necessary to strictly regulate the time interval of the data, and, for this purpose, means are required for correcting such a time base error of the reproduced data. For example, in a digital picture recording and reproducing system, a picture is divided into a plurality of blocks $B_1$ to $B_{59}$, and each of the blocks is further divided into sub-blocks $SB_1$ to $SB_{20}$ as shown in FIG. 1. In the recoding mode, a digital picture data of a predetermined length [represented generally by a sub-block $(B_i\text{-}Sb_j)$ herein] is recorded as a unit on a recording medium such as a magnetic tape, and number data including a block number $B_i$ and a sub-block number $SB_j$ is inserted in the head of each sub-block to form each record, as shown in FIG. 2. In the playback mode, the digital picture data of each sub-block is written once in a memory at an address corresponding to the affixed number data (the block number $B_i$ and sub-block number $SB_j$), and the picture data sequentially written in the memory is read out in synchronism with a stabilized system clock applied from a time base correcting device, so that the time base of the picture data read out from the memory can be corected, by means of the time base correcting device.

However, when, for example, degradation of the reproduced signal quality or dropout of data occurs due to the presence of a scar on the tape or attachment of dust to the tape, a code error appears in the reproduced digital picture data. When such a code error appears in the part of the number data (the block number $B_i$ and sub-block number $SB_j$) of the records, the reproduced digital picture data is written in the memory at incorrect addresses regardless of the function of the time base correcting device. In such a case, the read-out sequence becomes out of order resulting in appearance of a serious defect on the reproduced picture. Suppose, for example, that a picture is divided into ten blocks $B_1$ to $B_{10}$ as shown in FIG. 3(a), and errors occur in the blocks $B_3$ and $B_5$, resulting in relative displacement of these blocks $B_3$ and $B_5$. In such a case, an incorrect picture as shown in FIG. 3(b) will be reproduced.

Japanese Unexamined Patent Publication No. 55-80868 (1980) proposes a solution to the problem described above. According to the disclosure of the cited publication, a predetermined synchronization pattern is used in lieu of the address data such as the sub-block number, and the write position in the memory is specified by a count of a counter responding to detection of such a sync pattern. However, the proposed method is also defective, in that, once proper detection of the sync pattern fails due to, for example, the presence of dropout, the count of the counter does not indicate the correct write-in position any more, and appearance of disorder on the reproduced picture results.

Japanese Unexamined Patent Publication No. 58-99080 (1983) proposes another solution to the aforementioned problem. The method disclosed in the cited publication comprises recording an error detection and correction code together with inserted number data, estimating succeeding number data on the basis of preceding number data used for specifying the writein position, and using the read-out number data in the playback mode when no error is detected or when a detected error is correctable, but using the estimated number data when the detected error is not correctable. However, the error detection and correction code requires extra bits, and its ability to effect error detection and correction to completely eliminate the possibility of overlooking errors in limited. An attempt to enhance the error detection rate leads necessarily to a great increase in the number of required bits. Especially, when the error is attributable to the presence of a burst, for example, or a dropout, not much can be expected of the error detection by the use of redundant bits.

SUMMARY OF THE INVENTION

It is a primary object of the present invention to provide a time base correcting device by the function of which digital picture data read out from a recording medium is first written in a memory and then read out from the memory in synchronism with an accurate clock. More specifically, it is an object of the present invention to provide an improved time base correcting device in which malfunction due to a code error attributable to various factors including dropout can be prevented to enhance the reliability of reproduction of the digital picture data.

In the time base correcting device according to the present invention, number data (or a corresponding address data) read out from a recording medium in the playback mode is continuously compared with number data (or a corresponding address data) estimated on the basis of preceding number data (or a corresponding address data) which has been proved correct already. When sporadic non-coincidence is detected as a result of comparison, it is considered to be attributable to an incidental code error present in the number data read out from the recording medium. In such a case, therefore, the address corresponding to the estimated number data is adopted.

When, on the other hand, non-coincidence between the number data is continuously detected a predetermined number of times or more, there is the possibility that the estimated number data is erroneous or wrong. However, in this case too, the read-out number data is not necessarily correct number data. Therefore, whether or not the read-out number data falls within a predetermined range is checked. This is because the read-out number data is given according to a fixed rule and it falls naturally within a fixed range when it is correct. Therefore, when the read-out number data falls within a predetermined range, the address corresponding to the read-out number data is adopted, but, when the read-out number data does not fall within the predetermined range, the read-out number data is considered to be erroneous, and, instead, the address corresponding to the estimated number data is adopted.

In this case, in order to further enhance the reliability, a condition is additionally set forth in which number data (or a corresponding address data) is also estimated on the basis of the read-out number data (or the corresponding address data) to detect that the two data coincide with each other a predetermined number of times or more. When this condition and the aforementioned condition are both satisfied, the read-out number data is regarded to be correct and is adopted.

According to the present invention, the reliability of the playback system is greatly improved since the rate of writing data in wrong positions of the memory is greatly reduced as compared to that in the prior art. Especially, the effect of preventing malfunction due to dropout attributable to the presence of a scar, dust or the like on a magnetic tape is markedly improved.

BRIEF DESCRIPTION OF THE DRAWINGS

FIG. 1 illustrates a prior art manner of division of picture data into blocks.

FIG. 2 illustrates a prior art, data recording format which is also employed in an embodiment of the present invention.

FIG. 3, consisting of (a) and (b), illustrates a picture reproduced by a prior art playback system.

FIG. 6 shows schematically the relation between an input and an output of the address generating ROM shown in FIG. 5.

FIG. 7 shows schematically the relation between an input and an output of the estimated address generating ROM shown in FIG. 5.

FIG. 9, consisting of (A)–(H), is a time chart of the operation of the embodiment shown in FIG. 5.

FIG. 10 shows the result of comparison between reproduced addresses and estimated addresses in the operation mode shown in FIG. 9 and shows also corresponding write-in addresses.

DESCRIPTION OF THE PREFERRED EMBODIMENTS

Preferred embodiments of the time base correcting device according to the present invention will now be described in detail.

FIG. 2 illustrates a data format which is also employed in the embodiments of the present invention. Referring to FIG. 2, digital picture data corresponding to one scene displayed on a screen are divided into a plurality of blocks each of which is further divided into a plurality of sub-blocks which are units recorded in series on a recording medium. In FIG. 2, the reference symbols B and SB designate the block number and sub-block number respectively. For example, the block number B increases progressively from 1 to 59, and the sub-block number SB is repeated from 1 to 20. Each sub-block includes a plurality of words, and a synchronization (sync) pattern S inserted in the head of each sub-block provides a basis for attaining word synchronization.

Figure 4:
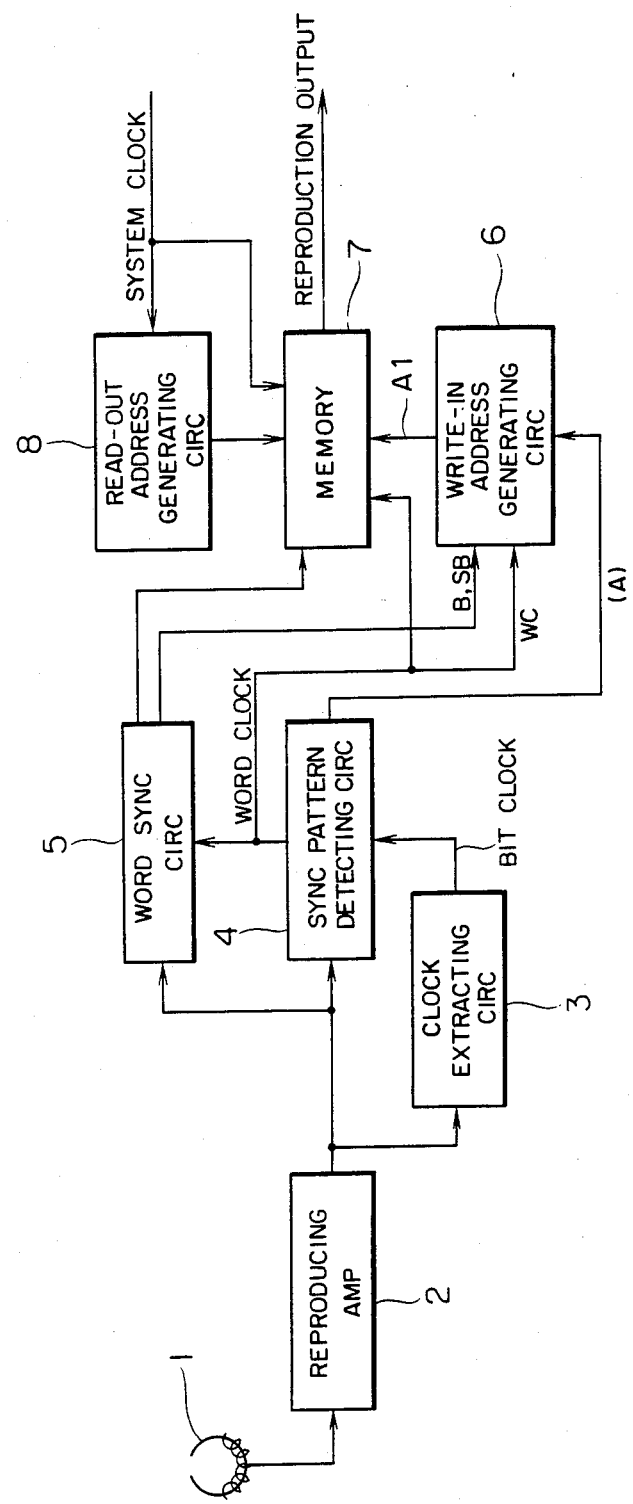
FIG. 4 is a block diagram showing the structure of one form of a playback system to which the present invention is applied.

FIG. 4 shows the general structure of one form of a playback system to which the present invention is applied. Referring to FIG. 4, an input signal read by a magnetic head 1 is amplified and shaped in a reproducing amplifier 2, and a bit clock is extracted from the output of the reproducing amplifier 2 by a clock extracting circuit 3. A sync pattern detecting circuit 4 detects the sync pattern S in the output signal of the reproducing amplifier 2, and generates clocks including a word clock on the basis of the detected sync pattern S. On the basis of the word clock, a word synchronization (sync) circuit 5 divides the output of the reproducing amplifier 2 into unit words. The block number B (of one word) and the sub-block number SB (of also one word) are transferred to a write-in address generating circuit 6, while the picture data Bi-SBj is transferred to a memory 7. The write-in address generating circuit 6 has a direct concern with the present invention. Briefly describing, the block number B and sub-block number SB transferred to the write-in address generating circuit 6 are used to generate the address of the picture data to be written in the memory 7. After a predetermined amount of data (corresponding to, for example, one scene) is stored in the memory 7, a read-out address generating circuit 8 generates read-out addresses in a predetermined order, and, according to the read-out addresses, the data stored in the memory 7 is sequentially read out in synchronism with a stabilized system clock to appear as a reproduced picture signal. Commonly, a plurality of such memories 7 are provided to be switched over so that data can be read out from one of them while data is written in another.

Figure 5:
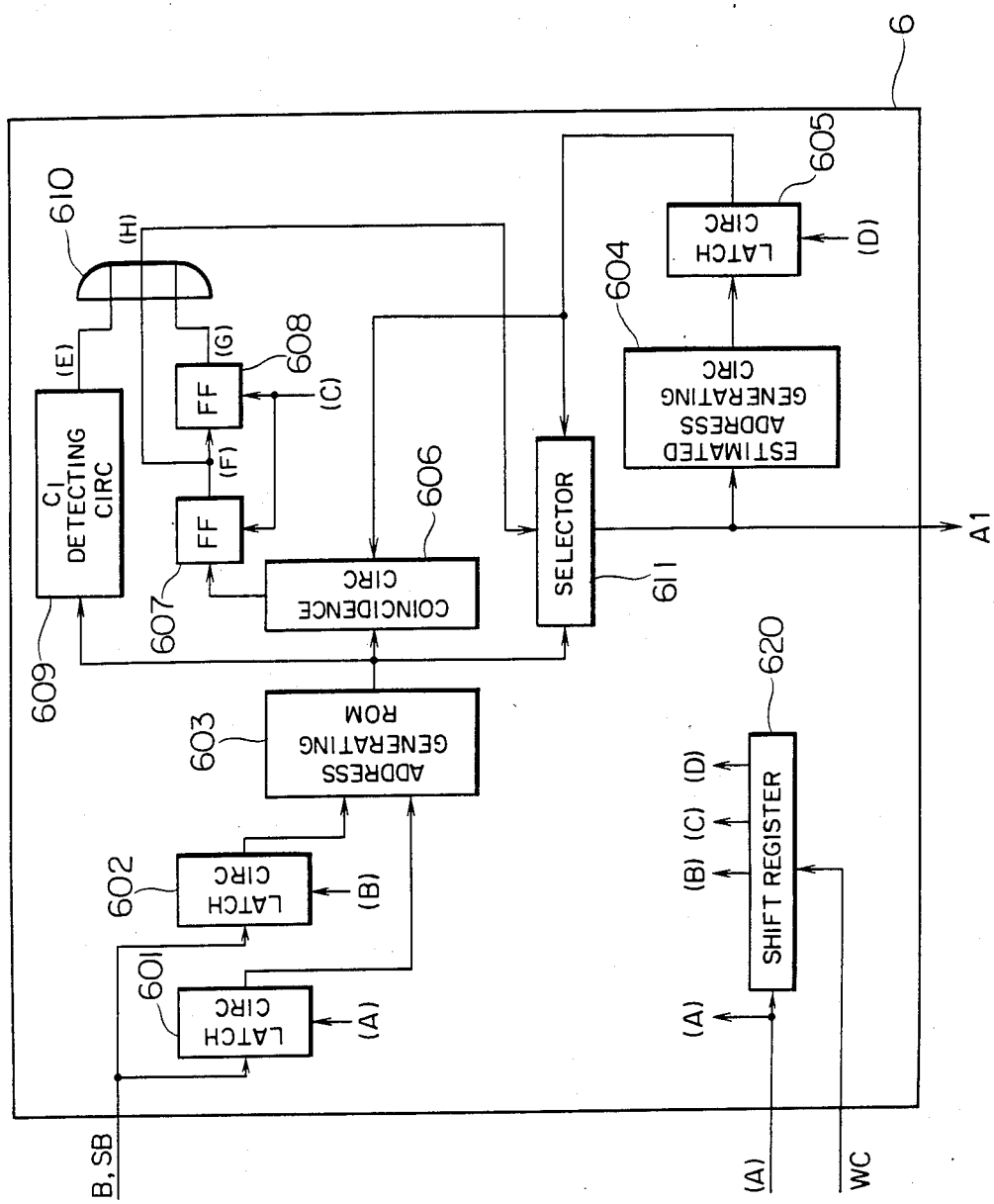
FIG. 5 is a block diagram showing the structure of part of an embodiment of the time base correcting device according to the present invention.

FIG. 5 shows the detailed structure of part of the embodiment of the time base correcting device of the present invention. More precisely, FIG. 5 shows the structure of the write-in address generating circuit 5 shown in FIG. 4. Referring to FIG. 5, the reference numerals (A) to (D) designate clocks each having a subblock period and generated at the head of the period of each sub-block. These clocks are generated from a shift register 620 in such a relation that they are delayed relative to each other by the period of the word clock in an alphabetical order, as shown in FIG. 9. A latch circuit 601 latches the block number B in response to the application of the clock (A), and another latch circuit 602 latches the sub-clock number SB in response to the application of the clock (B). In response to the application of the block number B and sub-block number SB, and address generating ROM 603 generates an address (hereinafter referred to as a reproduced address) corresponding to the combination of the specific block number B and sub-block number SB. FIG. 6 illustrates schematically the relation between the input IN to and the output OUT from the address generating ROM 603. It will be seen in FIG. 6 that, when a block number B and a sub-block number SB applied to the address generating ROM 603 fall within the aforementioned predetermined range Bn of from 1 to 59 and that SBm of from 1 to 20 respectively, a reproduced address Ah corresponding in a 1:1 relation to each of their combinations is generated from the address generating ROM 603. However, when any one of the block number B and the sub-block number SB does not fall within the predetermined range Bn or SBm, a particular bit pattern C₁ is generated from the address generating ROM 603.

On the other hand, in response to the application of a memory address A₁ used for writing of data in the memory 7 in a cycle, an estimated address generating ROM 604 generates an estimated address estimated to be applied as a succeeding write-in address. FIG. 7 illustrates schematically the relation between the input IN in and the output OUT from the estimated address generating ROM 604. It will be seen in FIG. 7 that the input to the estimated address generating ROM 604 is an address $A_k$ used for writing a data in the memory 7 in a cycle, and its output is a succeeding address $A_{k+1}$. However, when the input to the estimated address generating ROM 604 is the particular bit pattern $C_1$ described above, its output is another particular bit pattern $C_2$. A latch circuit 605 latches the output (that is, the estimated address) of the estimated address generating ROM 604 in response to the application of the clock (D).

The estimated address generated from the latch circuit 605 and the reproduced address generated from the address generating ROM 603 are compared with each other in a coincidence circuit 606. When these addresses coincide with each other, an output of high level appears from the coincidence circuit 606. This output of high level is applied to a shift circuit composed of two cascade-connected flip-flops 607 and 608 triggered by the clock (C). The significance of this shift circuit will be described later. When a $C_1$ detecting circuit 609 detects that the output of the address generating ROM 603 is the particular bit pattern $C_1$, it generates an output (E) of high level. This highlevel output (E) of the $C_1$ detecting circuit 609 is applied to an OR circuit 610 together with the outputs (F) and (G) of the respective flip-flops 607 and 608, and the resultant output (H) of this OR circuit 610 controls a selector 611. This selector 611 selects the output (the estimated address) of the latch circuit 605 when the output (H) of the OR circuit 610 is in its high level, but selects the output (the reproduced address) of the address generating ROM 603 when the output (H) of the OR circuit 610 is in its low level. The selected output of the selector 611 is applied as the write-in address $A_1$ to the memory 7 shown in FIG. 4.

Figure 8:
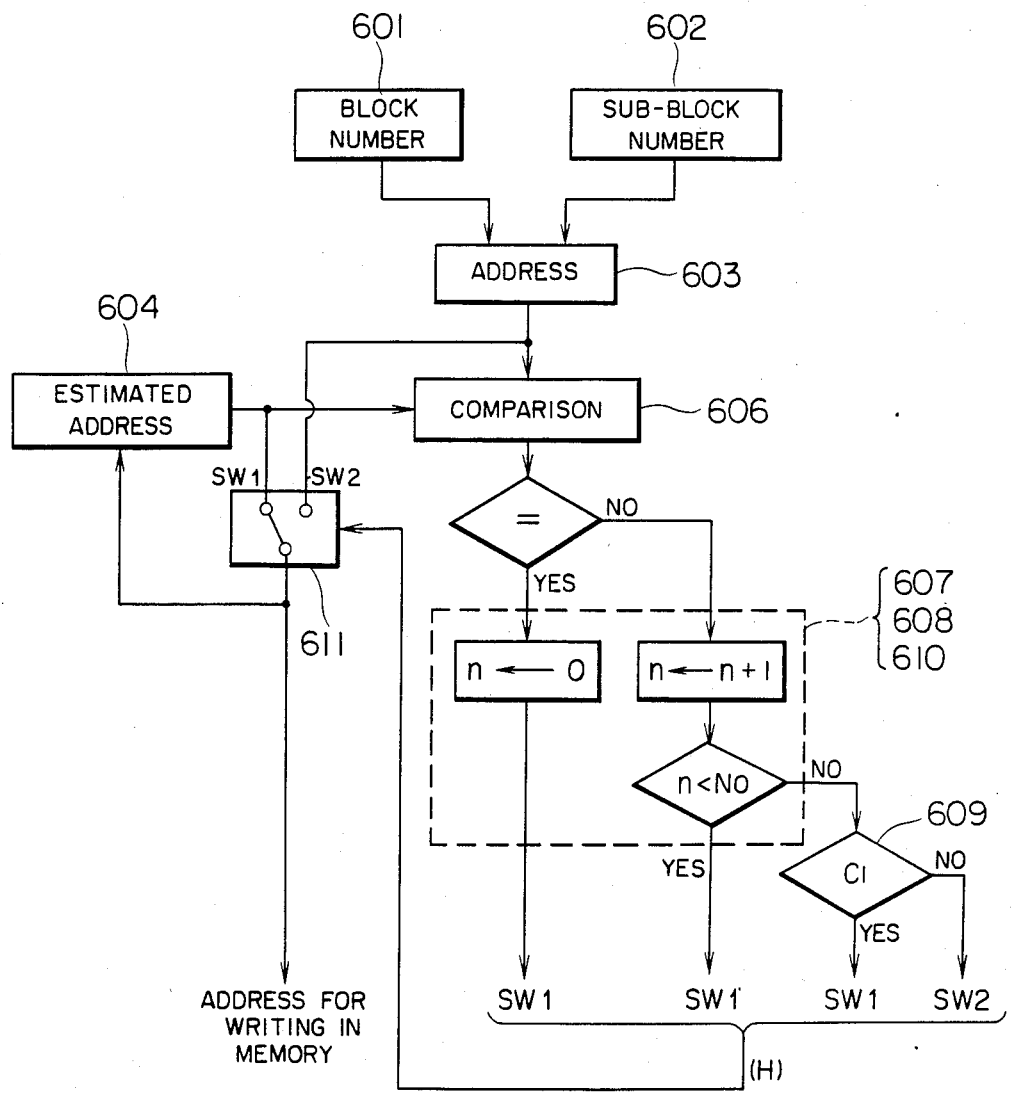
FIG. 8 is a flow chart showing the steps of processing in the embodiment shown in FIG. 5.

FIG. 8 is a flow chart showing the steps of processing in the write-in address generating circuit 6 shown in FIG. 5. In FIG. 8, the individual blocks indicating the processing steps are designated by the same reference numerals used in FIG. 5 for designating the blocks carrying out the operations corresponding to the processing steps.

In the step 601, a block number Bi is read out, and, in the step 602, a sub-block number SBj is read out. In the step 603, the reproduced address is generated on the basis of the block number Bi and sub-block number SBj read out in the respective steps 601 and 602. In the step 604, an estimated address is generated. Then, the reproduced address is compared with the estimated address in the step 606. When coincidence therebetween is detected, the count n of the number of non-coincidence times counter composed of the flip-flops 607 and 608 is restored to zero, and the selector 611 selects the estimated address. On the other hand, when non-coincidence is detected, the number of times of continuous non-coincidence up to that time is checked. That is, the count n of the counter is incremented to n+1, and whether or not the result attains a predetermined setting No is checked. When the result of checking proves that the incremented count is not equal to or less than No, it is decided that at least one of the read-out block number and the read-out sub-block number is erroneous, and the estimated address estimated in the step 604 is selected by the selector 611. However, a problem arises when the number of times of continuous non-coincidence attains the predetermined setting No.

In the embodiment shown in FIG. 5, the counting of the number of times of non-coincidence and the judgement of the count described above is equivalently realized by the combination of the flip-flops 607, 608 and the OR circuit 610 in the case where the predetermined setting No is selected to be No=2. More precisely, the flip-flop 607 is set when coincidence is detected, while it is reset from its set state when non-coincidence is detected. This state of the flip-flop 607 is shifted to the flip-flop 608 in the succeeding cycle. Therefore, the states of these two flip-flops 607 and 608 represent the results of two consecutive steps of comparison. Thus, when the outputs (F) and (G) of the respective flip-flops 607 and 608 are both in their low level, it indicates that non-coincidence is continuously detected at least twice.

Even when the number of times of continuous non-coincidence attains the predetermined setting No, it cannot necessarily be decided that the estimated address is wrong, and both the read-out block number and the read-out sub-block number (hence, the corresponding address) are correct. For example, dropout due to the presence of a scar on a magnetic tape or attachment of dust to the tape may occur over a plurality of sub-blocks, and, as a result, all of the block numbers and sub-block numbers in that range may be destroyed. In many cases, this destroyed number data does not reflect the real values of the block and sub-block numbers. In such a case, employment of the reproduced address derived from the read-out block and sub-block numbers so as to deal with detection of a plurality occurrences of continuous noncoincidence between it and the estimated address, would not in any way improve the situation and would rather promote disorder of the reproduced picture.

The present invention is featured by the fact that, when non-coincidence is continuously detected a predetermined number of times No, whether or not the read-out block number or sub-block number has its proper value falling within the previously determined range, is further checked. More precisely, when the read-out block number or sub-block number does not fall within the primarily determined range, the address generating ROM 603 generates the particular pattern $C_1$, and the $C_1$ detecting circuit 609 detects this particular pattern $C_1$ to maintain the output (H) of the OR circuit 610 in its high level, so that the selector 611 now selects the estimated address. On the other hand, when the particular pattern $C_1$ is not detected, the output (H) of low level appears from the OR circuit 610 indicating that both the read-out block number and the read-out sub-block number are correct, and the corresponding reproduced address is selected by the selector 611.

FIG. 9 shows the waveforms (A) to (H) appearing in the write-in address generating circuit 6 shown in FIG. 5 in relation to a table as shown in FIG. 10. In FIG. 10, the symbols in the parentheses designate estimated addresses. I the cycle I, the reproduced address $A_k$ derived from the read-out block number and sub-block number coincides with the estimated address $A_k$, and this estimated address $A_k$ is selected since the signal (F), hence, the signal (H) is in its high level. In the cycle II, the reproduced address $A'_k$ does not coincide with the estimated address $A_{k+1}$. As a result, the signal (F) is in its low level, but the signal (H) is in its high level since the level of the signal (G) is high. Therefore, the estimated address $A_{k+1}$ is selected. In the cycle III too, the reproduced address $A''_k$ does not coincide with the estimated address $A_{k+2}$. As a result, both the signals (F) and (G) are in their low level, and, in this case, the level of the $C_1$ detection signal (E) is also low. Therefore, the reproduced address $A''_k$ is now selected. In the cycle IV, the output of the address generating ROM 603 is the parcitular pattern $C_1$ which does not coincide with the estimated address $A''_{k+1}$. Non-coincidence has occured continuously in the three consecutive cycles II, III and IV, and the levels of both the signals (F) and (G) are low. However, the signal (E) is in its high level since the particular pattern $C_1$ is detected. As a result, the level of the signal (H) is high, and the estimated address $A''_{k+1}$ is now selected. In the cycle V, the reproduced address $A''_{k+2}$ coincides with the estimated address $A''_{k+2}$, and the signal (H) is in its high level since the level of the signal (F) is high. As a result, the estimated address $A''_{k+2}$ is selected. The same applies to the cycle VI. In the aforementioned cycle IV, the estimated address $A''_{k+1}$ is selected in lieu of the reproduced address since the particular pattern $C_1$ is detected. Unless the estimated address is selected in the cycle IV, writing of the data in the memory 7 shown in FIG. 4 will become impossible, and the sub-block data will be lost resulting in appearance of a serious defect on the reproduced picture.

The above description has based on the premise that the reproduced address should fall within a predetermined range. Actually, however, there may be a case where the reproduced address falling within the predetermined range is still erroneous. In order to further enhance the reliability, another checking arrangement is preferably additionally provided in the circuit 6 shown in FIG. 5. According to this additional checking arrangement, a circuit for estimating a succeeding reproduced address from the preceding reproduced address (for example, a ROM similar to that shown in FIG. 7) is separately provided so that the estimated address by such a circuit is compared with the reproduced address in each cycle. Unless coincidence is detected continuously a predetermined number of times, the estimated address, instead of the reproduced address, is selected even when the number of times of continuous non-coincidence detected by the coincidence circuit 606 shown in FIG. 5 has attained the predetermined setting No.

Figure 11:
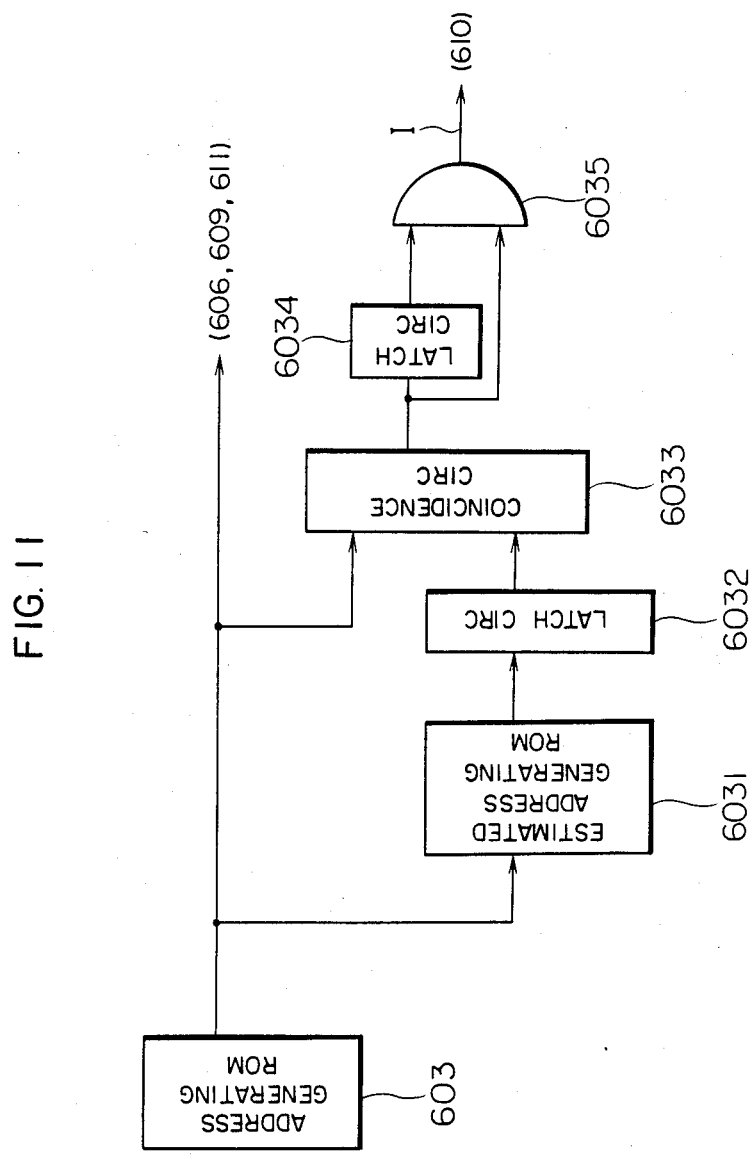
FIG. 11 is a block diagram showing the structure of another embodiment of the present invention.

FIG. 11 shows such a modification, and elements to be added to the embodiment shown in FIG. 5 are illustrated only. Referring to FIG. 11, the reproduced address generated by the address generating ROM 603 shown in FIG. 5 is applied to the coincidence circuit 606, $C_1$ detecting circuit 609 and selector 611 (not shown). On the other hand, the same reproduced address is also applied to an estimated address generating ROM 6031 which estimates a succeeding address, and the output of a latch circuit 6032 latching the output of the estimated address generating ROM 6031 is applied to a coincidence circuit 6033 which detects coincidence between the estimated value and the reproduced value. The result of coincidence detection is latched in another latch circuit 6034, and an AND circuit 6035, to which the output of the coincidence circuit 6033 and that of the latch circuit 6034 are applied, judges as to whether or not the reproduced value and the estimated value coincide with each other two continuous times. The output I of the AND circuit 6035 is applied as an additional input to the OR circuit 610 shown in FIG. 5. Thus, the output of the estimated address generating ROM 604 is changed over only when the number of times of continuous coincidence of the reproduced value itself with the estimated value exceeds a predetermined setting.

In the aforementioned embodiments of the present invention, an address corresponding to a block number and a sub-block number is estimated and compared with a reproduced address instead of directly estimating and comparing block numbers and sub-block numbers. It is apparent, however, that any one of the above modes can be selected as desired since there is a 1:1 correspondence between the number data and the address.

What is claimed is:

1. A digital data playback system for reproducing digital data from a recording medium, which digital data are divided into a plurality of data blocks and recorded as a predetermined sequence of unit records each including a data block and a number data affixed thereto, said system comprising:

first read-out means for sequentially reading out the records from said recording medium;

memory means having a storage capacity enough for storing a plurality of records read out by said first read-out means;

write-in means for writing the read-out records in said memory means; and second read-out means reading out, according to a predetermined order, the records written in said memory means;

said write-in means comprising:

address supplying means for supplying a write-in address of a record read out from said recording medium by said first read-out means to said memory means;

estimating means for estimating, on the basis of the write-in addess supplied from said address supplying means, the number data included in a succeeding record to be read out next by said first read-out means; and address selecting means for comparing the number data estimated by said estimating means with the actual number data included in the record read out by said first read-out means and supplying one of the number data selected as the result of comparison to said address supplying means as a write-in address of the record read out by said first read-out means; wherein said address selecting means includes first judging means for judging whether or not the number of times of continuous non-coincidence between the number data estimated by said estimating means and the actual number data included in the records read out by said first read-out means exceeds a predetermined setting, and, when said judging means judges that the number of times of continuous non-coincidence exceeds the predetermined setting, the actual number data included in the record read out at that time is supplied to said address supplying means as the write-in address.

2. A digital data playback system as claimed in claim 1, wherein said address selecting means includes second judging means for judging whether or not said actual number data falls within a predetermined range, and, when said first judging means judges that the number of times of continuous non-coincidence exceeds the predetermined setting, and said second judging means judges that said actual number data falls within the predetermined range, said actual number data is supplied to said address supplying means as said write-in address.

3. A digital data playback system as claimed in claim 1, wherein the predetermined setting of the number of times of continuous non-coincidence judged by said first judging means is two.

4. A digital data playback system as claimed in claim 2, wherein the predetermined setting of the number of times of continuous non-coincidence is two.

5. A digital data playback system as claimed in claim 2, wherein said write-in means includes second estimating means for estimating, on the basis of the number data included in the record read out by said first read-out means, the number data included in a succeeding record to be read out next by said first read-out means, and third judging means for judging whether or not the number of times of continuous coincidence between the number data estimated by said second estimating means and the actual number data included in the records read out by said first read-out means exceeds a predetermined setting, and, when said first judging means judges that the number of times of continuous non-coincidence exceeds the predetermined setting, said second judging means judges that said actual number data falls within the predetermined range, and said third judging means judges that the number of times of continuous coincidence exceeds the predetermined setting, said actual number data is supplied to said address supplying means as said write-in address.

6. A digital data playback system as claimed in claim 1, wherein a plurality of said memory means are provided, and, while said write-in means writes records in one of said memory means, said second read-out means reads out records from another memory means according to the predetermined order.

7. A digital data playback system as claimed in claim 1, wherein said write-in means writes the data blocks only of the read-out records in said memory means, and said second read-out means reads out said data blocks from said memory means according to the predetermined order.

* * * * *